(12) United States Patent
Cui et al.

(10) Patent No.: US 11,475,356 B2
(45) Date of Patent: Oct. 18, 2022

(54) DATA PROCESSING METHOD, ELECTRONIC DEVICE AND COMPUTER READABLE STORAGE METHOD FOR DEDUPLICATION OF A TRAINING DATASET

(71) Applicant: EMC IP Holding Company LLC, Hopkinton, MA (US)

(72) Inventors: Wei Cui, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 795 days.

(21) Appl. No.: 16/402,796

(22) Filed: May 3, 2019

(65) Prior Publication Data

US 2019/0385078 A1 Dec. 19, 2019

(30) Foreign Application Priority Data

Jun. 15, 2018 (CN) .......................... 201810618827.7

(51) Int. Cl.
*G06N 20/00* (2019.01)
*G06F 16/174* (2019.01)

(52) U.S. Cl.
CPC ......... *G06N 20/00* (2019.01); *G06F 16/1748* (2019.01)

(58) Field of Classification Search
CPC ..... G06N 20/00; G06F 3/0608; G06F 3/0641; G06F 16/1748; G06F 11/1453; G06F 3/067; G06F 16/215; H04L 67/1097
See application file for complete search history.

(56) References Cited

U.S. PATENT DOCUMENTS 9,292,584 B1 * 3/2016 Sharangpani ....... G06F 16/1744
2012/0117076 A1 * 5/2012 Austermann ....... G06F 16/2468
707/E17.049
2019/0294588 A1 * 9/2019 Xu ........................ G06F 16/319

OTHER PUBLICATIONS

Xia et al., A Comprehensive Study of the Past, Present and Future of Data Deduplication, published Aug. 2, 2016 by IEEE (Year: 2016).*

* cited by examiner

*Primary Examiner* — Eric J Yoon
(74) *Attorney, Agent, or Firm* — Ryan, Mason & Lewis, LLP

(57) ABSTRACT

A data processing method includes: obtaining a first subset and at least a second subset in a training dataset for learning, the first subset and the at least a second subset having a same size; determining a set of substrings based on data strings in the first subset and the at least a second subset, the substrings being suffix substrings of the data strings and being sorted in a lexicographical order; and determining a grain for deduplication of the training dataset from a set of longest common prefix (CLP) lengths of adjacent substrings in the set of substrings, for use in the deduplication. Thereby, different grains of duplicating procedures for different training datasets can be predicted automatically, and universality and flexibility of GPUaaS can be achieved. In addition, the deduplication rate can be improved, network resource waste can be reduced and system efficiency can be enhanced.

20 Claims, 6 Drawing Sheets

DATA PROCESSING METHOD, ELECTRONIC DEVICE AND COMPUTER READABLE STORAGE METHOD FOR DEDUPLICATION OF A TRAINING DATASET

RELATED APPLICATION(S)

The present application claims priority to Chinese Patent Application No. 201810618827.7, filed Jun. 15, 2018, and entitled "Data Processing Method, Electronic Device and Computer Readable Storage Medium," which is incorporated by reference herein in its entirety.

FIELD

Embodiments of the present disclosure generally relate to the field of computer, and more specifically relate to a data processing method, an electronic device and a computer readable storage medium.

BACKGROUND

Many data processing and computing tasks are currently performed through dedicated processors. For example, a graphical processing unit (GPU), as a common dedicated processor, is widely used as an accelerator for intensive computing tasks, such as high-performance computing (HPC), machine learning (ML) or deep learning (DL), due to its high performance. Since the dedicated processor, such as a GPU, is generally expensive, the overall utilization of the dedicated processor is quite low if each user only uses its local dedicated processor. Currently, a client-server model is used to build an architecture of a shared dedicated processor, such as GPU-as-a-Service (which is abbreviated as GPUaaS), to improve the utilization of the dedicated processor.

For an application such as machine learning, it is typically required in the GPUaaS architecture to transmit a large amount of data (for example, images) between the client and the server, and thus a large number of network bandwidth resources would be occupied. Considering repetition of the transmitted data in this type of application, it has been proposed to use data deduplication to reduce an amount of data transmitted between the client and the server. However, it is especially important for the data deduplication to select an appropriate deduplication grain. Therefore, the question of how to determine the deduplication grain has presently become an active research topic.

SUMMARY

According to example embodiments of the present disclosure, there are provided a data processing method, an electronic device and a computer readable storage medium.

In a first aspect of the present disclosure, there is provided a data processing method. The method comprises: obtaining a first subset and at least a second subset from a set of training data for learning, the first subset and the at least a second subset having a same size; determining a set of substrings based on data strings in the first subset and the at least a second subset, the substrings being suffix substrings of the data strings and being sorted in a lexicographical order; and determining a grain for deduplication of the training dataset from a set of longest common prefix (CLP) lengths of adjacent substrings in the set of substrings, for use in the deduplication.

In a second aspect of the present disclosure, there is provided an electronic device. The electronic device comprises: a processor; and a memory storing instructions which, when executed by the processor, cause the electronic device to: obtain a first subset and at least a second subset from a training dataset for learning, the first subset and the at least a second subset having a same size; determine a set of substrings based on data strings in the first subset and the at least a second subset, the substrings being suffix substrings of the data strings and being sorted in a lexicographical order; and determine a grain for deduplication of the training dataset from a set of longest common prefix (CLP) lengths of adjacent substrings in the set of substrings, for use in the deduplication.

In a third aspect of the present disclosure, there is provided a computer readable storage medium. The computer readable storage medium have computer executable instructions stored thereon which, when executed, cause a machine to implement the method in accordance with the first aspect of the present disclosure.

It is to be appreciated that this Summary is not intended to identify key features or essential features of embodiments of the present disclosure, nor is it intended to be used to limit the scope of the present disclosure. Other features of the present disclosure will be made clearer through the following description.

BRIEF DESCRIPTION OF THE DRAWINGS

The above and other objectives, features and advantages of example embodiments of the present disclosure will become more apparent, through the detailed description on example embodiments of the present disclosure with reference to the accompanying drawings, in which the same reference symbols generally represent the same components.

DETAILED DESCRIPTION

Embodiments of the present disclosure will be described in more detail with reference to the drawings. Although the drawings illustrate some embodiments of the present disclosure, it to be be appreciated that the present disclosure may be implemented in various manners but is not limited by the embodiments as described herein, and rather, these embodiments are provided to disclose the present disclosure more thoroughly and completely. Drawings and embodiments of the present disclosure are only provided as examples, without any intention to limit the protective scope of the present disclosure.

As used herein, the term "includes" and its variants are to be read as open-ended terms that mean "includes, but is not limited to." The term "based on" is to be read as "based at least in part on." The term "one embodiment" and "the embodiment" are to be read as "at least one embodiment." The term "first," "second" or the like can represent different or the same objects. Other definitions, either explicit or implicit, may be included below.

In description of embodiments of the present disclosure, the GPUaaS architecture is described as an example, but it is to be appreciated that the solution of the embodiments of the present disclosure is also applicable to a shared architecture of dedicated processors other than GPUs.

Figure 1:
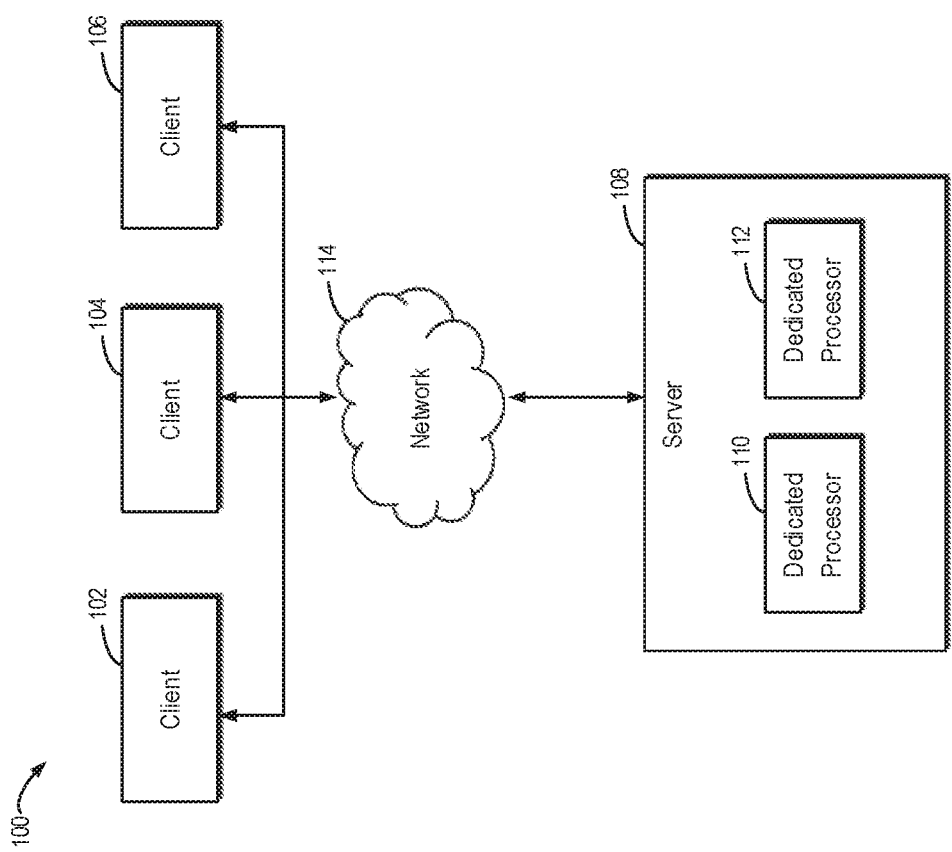
FIG. 1 illustrates a diagram of an example GPUaaS architecture in which embodiments of the present disclosure can be implemented.

As mentioned above, the GPUaaS provides a GPU function as a service by means of creating a client-server model. Reference will be made to FIG. 1 for a detailed description. FIG. 1 illustrates a diagram of an architecture 100 of providing a shared dedicated processor. As shown, the architecture 100 may include clients 102, 104 and 106, a server 108 and a network 114. Although FIG. 1 shows three clients 102, 104 and 106 and a server 108, it is to be appreciated by those skilled in the art that the architecture 100 may include any number of clients and any number of servers.

The clients 102, 104 and 106 can be user equipment connected to the server 108 via the network 114, such as a desk computer, laptop computer, tablet computer, smart phone and the like. The clients 102, 104 and 106 can run an application program thereon, such as a high performance computing application, machine learning application, deep learning application and the like.

The server 108 provides a shared dedicated processor for the applications running on the clients 102, 104 and 106, such as a shared GPU, a shared Field Programmable Gate of Arrays (FPGA) and the like, so as to provide accelerated computing. The server 108 can include dedicated processors 110 and 112. Although FIG. 1 only shows two dedicated processors 110 and 112, it is to be appreciated by those skilled in the art that the server 108 can include any number of dedicated processors. Besides the dedicated processors 110 and 112, the server 108 can further include other components not shown, for example, a general processor such as a central processing unit (CPU), a storage system and the like.

The clients 102, 104 and 106 expose a virtual dedicated processor interface (not shown in FIG. 1) to a user. When an application program on the clients 102, 104 and 106 requests for calling the virtual dedicated processor interface, a remote procedure call (RPC) channel is created between the clients 102, 104 and 106 and the server 108. The created RPC channel is used to transmit commands representing a dedicated processor function. For example, these commands can include duplicating data on the clients 102, 104 and 106 onto the dedicated processors 110 and 112, running the dedicated processor function, duplicating data on the dedicated processors 110 and 112 onto the clients 102, 104 and 106, and the like.

Figure 2:
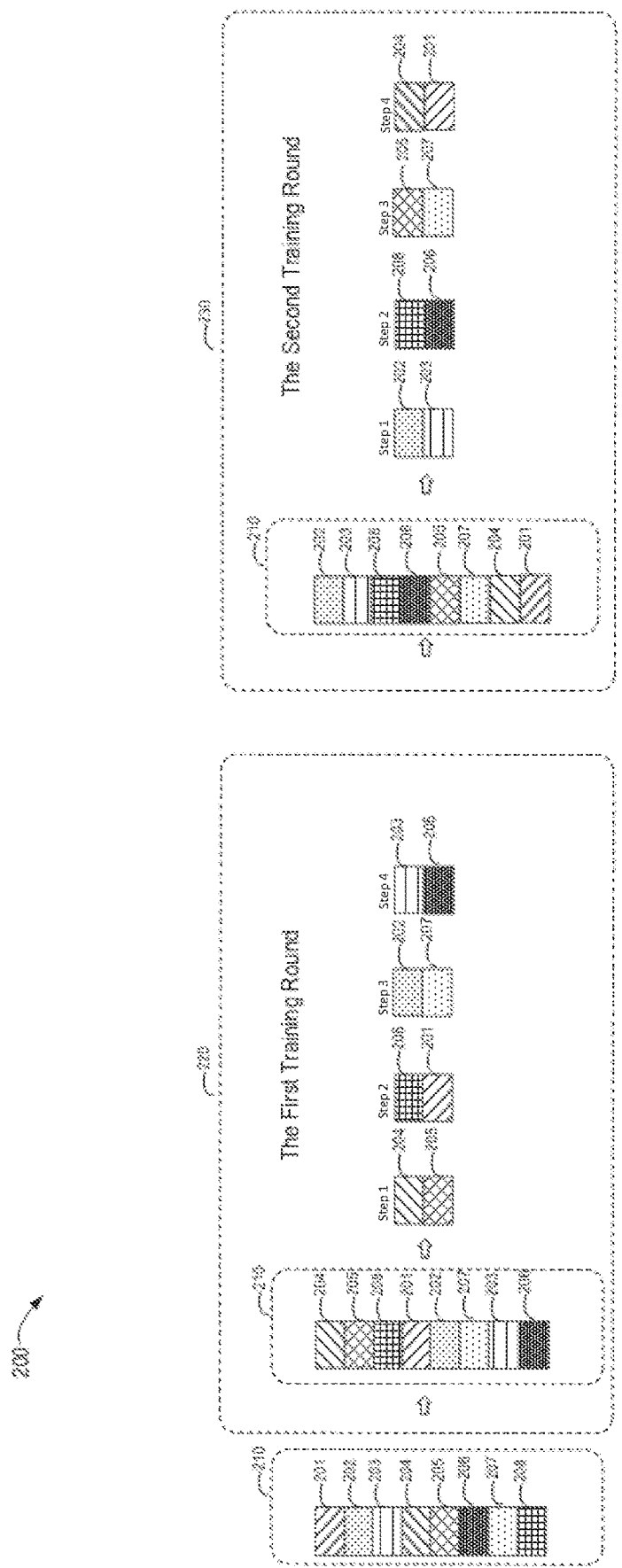
FIG. 2 illustrates a diagram of a procedure of training a deep learning model using the architecture of FIG. 1.

The architecture as shown in FIG. 1 can be used to promote the performance of the machine learning training. FIG. 2 illustrates a diagram of a procedure 200 of training a machine learning model under the architecture 100.

A dataset 210 is provided for training a machine learning model. The dataset 210 can include a plurality of data blocks 201, 202, 203, 204, 205, 206, 207 and 208. For example, during training of a model for facial recognition, each data block can represent a facial image; and during training of a model for speech recognition, each data block can represent a piece of speech, and the like. The dataset 210 can be stored in a memory of the clients 102, 104 and 106, or can be stored in a cloud.

During the course of model training utilizing the dataset 210, multiple training rounds 220 and 230 are typically involved. Although FIG. 2 only shows two training rounds, it is to be appreciated by those skilled in the art that the embodiments of the present disclosure are not limited to two training rounds. In each of the training round 220 and 230, full access to the dataset 210 for training is implemented, so as to perfect the trained model constantly.

Each training round 220 or 230 is comprised of a plurality of training steps. In each training round 220 or 230, the dataset 210 is first sorted randomly and then divided into subsets of an equal size for different training steps. As shown in FIG. 2, in the first training round 220, the dataset 210 is sorted randomly as a data block 204, data block 205, data block 208, data block 201, data block 202, data block 207, data block 203 and data block 206; and in the second training round 230, the dataset is sorted randomly as the data block 202, data block 203, data block 208, data block 206, data block 205, data block 207, data block 204 and data block 201. It is to be appreciated by those skilled in the art that the number and the sequence of the data blocks as shown in FIG. 2 are provided only as an example, to which embodiments of the present disclosure are not limited.

As shown, the randomly sorted dataset 210 is then divided into a plurality of subsets of an equal size for different training steps, and each subset is required to be duplicated from the clients 102, 104 and 106 onto the dedicated processors 110 and 112 in the server 108, for the use of the dedicated processors 110 and 112 to train the model. For example, in the first training round 220, the data block 204 and the data block 205 are applied to step 1, the data block 208 and the data block 201 are applied to step 2, the data block 202 and the data block 207 are applied to step 3, and the data block 203 and the data block 206 are applied to step 4. In the second training round 230, the data blocks 202 and 203 are applied to step 1, the data blocks 208 and 206 are applied to step 2, the data blocks 205 and 207 are applied to step 3, and the data blocks 204 and 201 are applied to step 4. It is to be appreciated by those skilled in the art that the number of steps and the number of data blocks included in the subset, as shown in FIG. 2, are only provided as an example, to which embodiments of the present disclosure are not limited.

In each training step, it is required to transmit the data blocks used at this step from the clients 102, 104 and 106 to the server 108. Hence, transmission of a large amount of repeated data between the client 102 and the server 108 occurs, causing time and resource waste over the network transmission. If there is a small network bandwidth, the dedicated processors 110 and 112 are caused to wait for data all the time, thereby affecting the performance of the dedicated processors 110 and 112. For example, at step 1 of the first training round 220, it is required to transmit the data block 204 from the client 102 to the server 108, while it is required to transmit the data block 204 from the client 102 to the server 108 at step 4 of the second training round 230. As the training rounds are continuously increased, more network resources will be consumed, which may even result in network congestion, and this further causes the dedicated processors 110, 112 to wait for data and thus affects the performance of the dedicated processors.

Directed to this problem, data deduplication has been proposed to reduce resource and time waste generated due to the transmission of a large amount of repeated data. Typically, for different architecture applications, such as TensorFlow, Keras, Caffe, Theano and the like, it is required to specify a respective deduplication grain in advance at an application layer according to experience, etc., so as to perform the data deduplication. For an infrastructure layer of the GPUaaS architecture, it is unable to determine which deduplication grain should be used for a different application. As such, universality and flexibility of the GPUaaS architecture for different applications are limited.

In light of this, the conception of embodiments of the present disclosure is to provide a solution enabling the GPUaaS architecture per se to automatically determine a deduplication grain in a transparent and efficient manner. According to the present conception, regarding a training dataset for learning (for example, the dataset 210 in FIG. 2), a set of substrings is determined using linear suffix substring sorting, based on data strings in data subsets corresponding to a plurality of training steps (for example, steps 1 to 4 in FIG. 2) in one or more training rounds (for example, the first training round 220 and the second training round 230 in FIG. 2), a set of CLP lengths of adjacent substrings in the set of substrings is used as a candidate set for the grain for the deduplication of the training dataset, and the grain for the deduplication is determined from the candidate set. The specific embodiments according to the present conception will be described below with reference to FIGS. 3 and 4.

Figure 3:
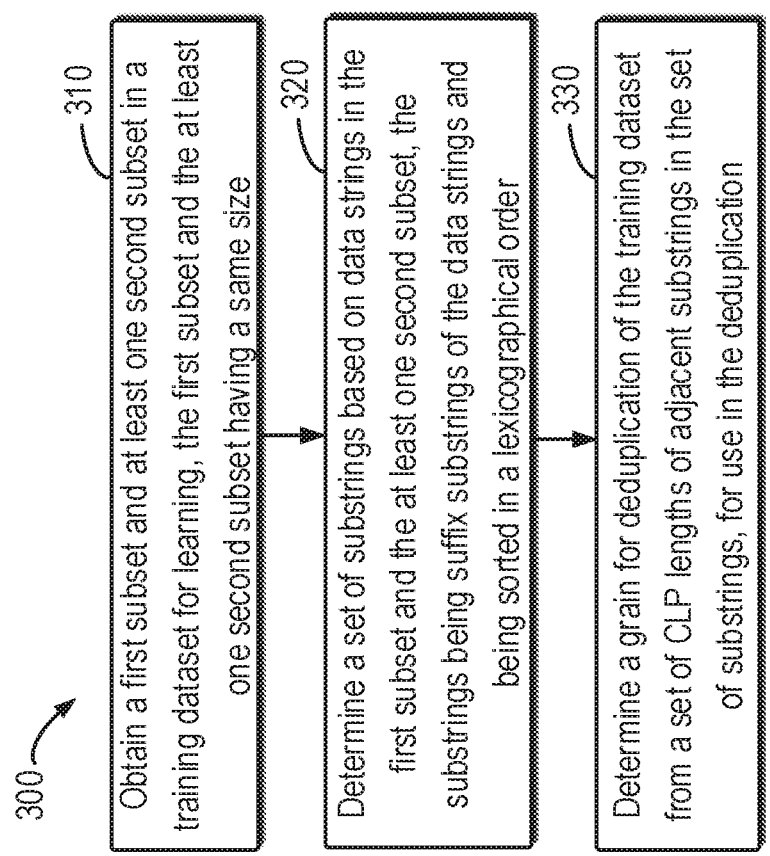
FIG. 3 illustrates a flowchart of a data processing method of determining a deduplication grain according to one embodiment of the present disclosure.

FIG. 3 illustrates a flowchart of a data processing method 300 of determining a deduplication grain according to embodiments of the present disclosure. The method 300 can be implemented at the clients 102, 104 and 106 as shown in FIG. 1, or can be implemented at the server 108 as shown in FIG. 1, and the present application is not limited in this regard.

As shown in FIG. 3, at block 310, a first subset (for example, the data blocks 204 and 205 at step 1 of FIG. 2) and at least a second subset (for example, the data blocks 208 and 201 at step 2 of FIG. 2) in the training dataset (for example, 210 of FIG. 2) for learning can be obtained. According to embodiments of the present disclosure, the first subset and the at least a second subset may have the same size. For example, when the method 300 is implemented at the clients 102, 104 and 106, the client 102, 104 or 106 can equally divide the training dataset 210 into several subsets, so as to obtain the first subset and the at least a second subset. For example, when the method 300 is implemented at the server 108, the server 108 may receive the respective subsets of the training dataset 210 from the client 102, 104 or 106, at steps 1 to 4 as shown in FIG. 2, so as to obtain the first subset and the at least a second subset. According to embodiments of the present disclosure, the first subset and the second subset can be any of the subsets obtained by equally dividing the training dataset 210.

At block 320, a set of substrings is determined based on data strings in the first subset and the at least a second subset. The substrings in the set of substrings are suffix substrings of the data strings and are sorted in a lexicographical order. According to embodiments of the present disclosure, it can be implemented using a linear suffix substring sorting algorithm existing in the art, such as a DC3 algorithm, a multiplication algorithm and the like. Of course, it is to be appreciated that it can be implemented using other similar algorithms existing in the art or to be developed in the future.

In embodiments of the present disclosure, a respective substring set can be determined for each second subset. It is assumed that the first subset corresponds to the first data string A, and the second subset corresponds to the second data string B. According to embodiments of the present disclosure, the first data string and the second data string are concatenated by inserting a separator (for example, $) between the first data string A and the second data string B, and the set of substrings can be determined based on a sorting in the lexicographical order for the suffix substrings of the concatenated data string.

For example, supposing that A="abccccfee" and B="feeaacccc", the concatenated data string can be "abccccfee$feeaacccc". It can be determined therefrom that the suffix data substrings of the concatenated data string are as follows:
abccccfee$feeaacccc
bccccfee$feeaacccc
ccccfee$feeaacccc
cccfee$feeaacccc
ccfee$feeaacccc
cfee$feeaacccc
fee$feeaacccc
ee$feeaacccc
e$feeaacccc
$feeaacccc
feeaacccc
eeaacccc
eaacccc
aacccc
acccc
cccc
ccc
cc
c The suffix substrings after being sorted in the lexicographical order are presented as follows:
aacccc
abccccfee$feeaacccc
acccc
bccccfee$feeaacccc
c
cc
ccc
cccc
ccccfee$feeaacccc
cccfee$feeaacccc
ccfee$feeaacccc
cfee$feeaacccc
eaacccc
eeaacccc
ee$feeaacccc
e$feeaacccc
fee$feeaacccc
feeaacccc
$feeaacccc Therefore, the set of substrings can be determined. For ease of description, the data string is presented above in a simplified form, but is not limited to this form.

At block 330, a grain for the deduplication of the training dataset is determined from a set of CLP lengths of adjacent substrings in the set of substrings, so as to be used in the deduplication. For example, based on the set of substrings as determined above, the set of the CLP lengths (which are respectively denoted by "height") of the respective adjacent substrings and the set of the lengths of the substrings (which are respectively denoted by "sub-length") are presented as follows:
height=0, sub-length=6
height=1, sub-length=19
height=1, sub-length=5 height=0, sub-length=18
height=0, sub-length=1
height=1, sub-length=2
height=2, sub-length=3
height=3, sub-length=4
height=4, sub-length=17
height=3, sub-length=16
height=2, sub-length=15
height=1, sub-length=14
height=0, sub-length=7
height=1, sub-length=8
height=2, sub-length=12
height=1, sub-length=11
height=0, sub-length=13
height=3, sub-length=9
height=0, sub-length=10

In the solution according to embodiments of the present disclosure, the set of the CLP lengths corresponding to the substrings in the set of substrings is used as a candidate set of grains for the deduplication, and the grain is determined from the candidate set. Since the set of substrings is obtained using the linear suffix substring sorting method, it incurs a low computing complexity and low cost overhead.

It is to be appreciated that an appropriate CLP length can be selected from the determined candidate set as the grain for the deduplication, based on any appropriate criterion. According to embodiments of the present disclosure, the grain can be determined from the candidate set, based on a length (i.e., a size) of the first subset A and each of the CLP lengths in the candidate set. In some embodiments, any CLP length capable of dividing equally the length of the subset A can be selected from the candidate set as the grain. In some embodiments, the CLP lengths being less than a predetermined value can be removed from the candidate set, and any CLP length can be selected from the reserved CLP lengths as the grain.

According to an alternative embodiment of the present disclosure, the grain is determined from the candidate set, based on a length of the first subset A and a length of each of the substrings. In some embodiments, CLP lengths of adjacent substrings that have length differences therebetween less than the length of the first subset A can be removed from the candidate set, and any CLP length can be selected from the reserved CLP lengths as the grain. In some embodiments, respective CLP lengths of adjacent substrings, none of which includes a separator or both of which include a separator, can be removed from the candidate set, and any CLP length can be selected from the reserved CLP lengths as the grain.

According to other embodiments of the present disclosure, a grain can be determined from a candidate set based on the number of times that each of the substrings occurs in the set of substrings corresponding to the respective second subset B. In some embodiments, CLP lengths corresponding to substrings with the highest number of times and the lowest number of times can be removed from the candidate set, and any CLP length can be selected from the reserved CLP lengths as a grain. In some embodiments, a CLP length corresponding to the substring having the largest product of the number of times that the substring occurs and the length of the substring can be selected as the grain.

Figure 4:
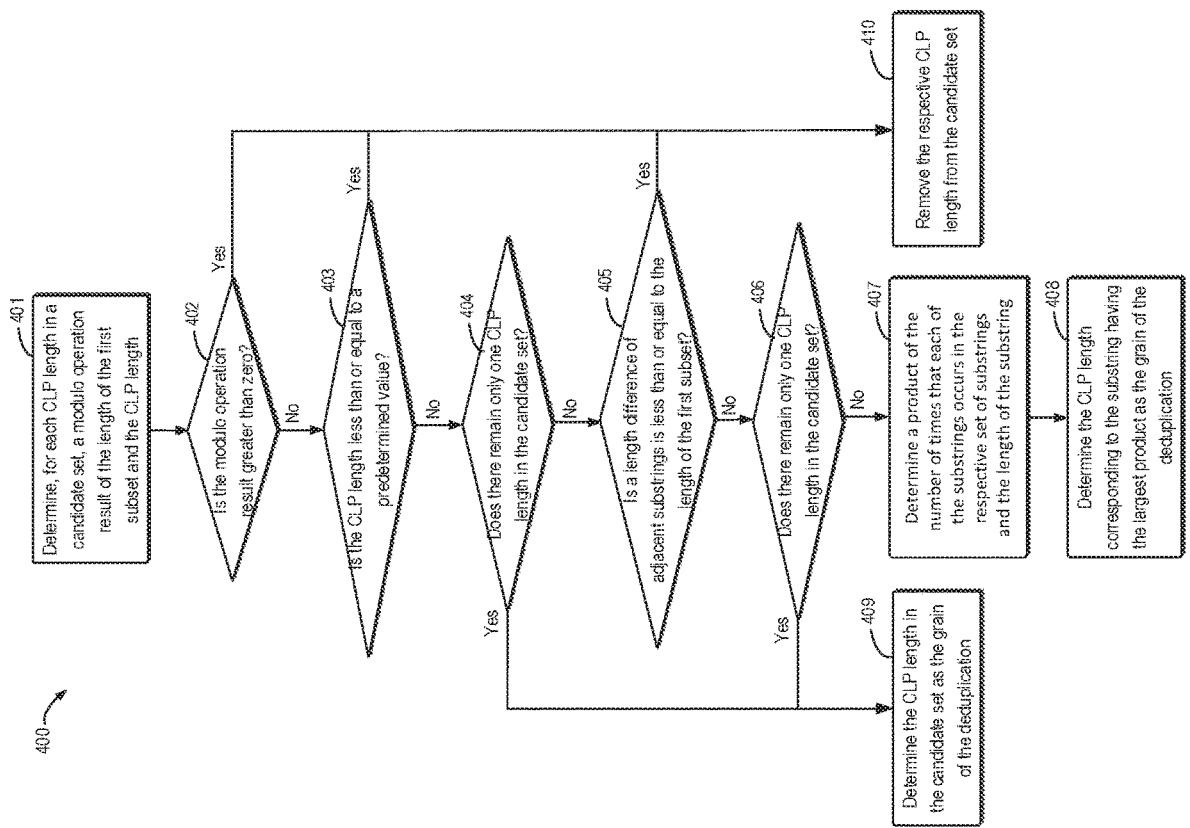
FIG. 4 illustrates a flowchart of a data processing method of determining a deduplication grain according to a further embodiment of the present disclosure.

It is to be appreciated that the manners for determining the grain can be used separately or in combination, according to needs. An example implementation of determining the grain from the candidate set according to embodiments of the present disclosure will be described below in detail with reference to FIG. 4. FIG. 4 illustrates a flowchart of a data processing method 400 of determining a deduplication grain according to a further embodiment of the present disclosure. In the embodiment, the grain can be filtered out from a candidate set in combination with the foregoing manner for determining the grain. The method 400 can be implemented at the clients 102, 104 and 106 as shown in FIG. 1, or can be implemented at the server 108 as shown in FIG. 1, and the present disclosure is not limited in this regard.

As shown in FIG. 4, at block 401, for each CLP length (height) in the candidate set, a modulo operation result of the length of the first subset A and the CLP length is determined. At block 402, it is determined whether the modulo operation result is greater than zero. In response to determining that the modulo operation result is greater than zero at block 402, it moves to block 410 at which the respective CLP length is removed from the candidate set. In response to determining that the modulo operation result is equal to zero at block 402, it moves to block 403 to perform a subsequent filtering procedure. By processing at blocks 401 to 402, the CLP length unable to divide the length of the subset A equally can be removed.

At block 403, it is determined whether each reserved CLP length is less than or equal to a predetermined value. According to embodiments of the present disclosure, the predetermined value can be set arbitrarily as needed. In response to determining that the CLP length is less than or equal to the predetermined value at block 403, it moves to block 410 at which the respective CLP length is removed from the candidate set. In response to determining that the CLP length is greater than the predetermined value at block 403, it moves to block 404. Through the processing at block 403, the exceedingly small CLP length can be removed.

After filtering at blocks 401 to 403, it is determined whether there only remains one CLP length in the candidate set at block 404. In response to determining that there only remains one CLP length at block 404, it moves to block 409 at which the one CLP length is determined as the deduplication grain.

The foregoing example is still employed herein, and the first subset A="abccccfee", which has a length 9. Supposing that the predetermined value is set to 1, having been subjected to the processing at blocks 410 to 430, the candidate set is filtered as follows:
height=3, sub-length=4
height=3, sub-length=16
height=3, sub-length=9

It is seen that, after being filtered at blocks 401 to 403, only the CLP length 3 is left in the candidate set in this example, which is determined as the deduplication grain.

The filtering procedure from blocks 401 to 403 is helpful to rapidly determine the deduplication grain. Typically, this is sufficient for an actual training dataset because the data in the datasets are completely random and thus have large grains. However, there may be a case of still containing a plurality of CLP lengths after the filtering procedure at blocks 401 to 403.

As a further example, supposing that the first subset A="abababcccccc" and the second subset B="ddababababab", the length of the first subset A is 12. The candidate set includes a plurality of CLP lengths: {2,3,4,5, 6,7,8}. After being processed at blocks 401 to 403, the candidate set is shrunk to {2, 3, 6}. Therefore, further filtering is required to determine the deduplication grain.

Continuing to refer to FIG. 4, in response to determining that there is still a plurality of CLP lengths in the candidate set at block 404, it moves to block 405 to continue filtering. At block 405, it is determined that the length difference of the adjacent substrings in the set of substrings is less than or equal to the length of the first subset.

In response to determining whether the length difference of two adjacent substrings is less than or equal to the length of the first subset at block 405, it moves to block 410 at which the respective CLP lengths of two adjacent substrings are both removed from the candidate set. In response to determining that the length difference of two adjacent substrings is greater than the length of the first subset at block 405, it moves to block 406 to determine whether there remains only one CLP length in the candidate set. In response to determining that there remains only one CLP length at block 406, it moves to block 409 at which the CP length is determined as the deduplication grain.

The above example is still employed herein, and after being processed at block 405, the candidate set is filtered as follows:

height=6 abababccccc$ddababababab wherein, only CLP length 6 is left, which is determined as the deduplication grain. However, after the filtering procedure from blocks 401 to 405, there may be a case that the candidate set still includes a plurality of CLP lengths. In this case, in some embodiments, a CLP length can be selected randomly as the grain. This probably affects the deduplication rate. In order to obtain a maximum deduplication rate, further filtering can be performed based on the number of times that each of the substrings occurs in the respective set of substrings, in some embodiments.

Referring to FIG. 4, in response to determining that there is a plurality of CLP lengths in the candidate set at block 406, it moves to block 407. At block 407, a product of the number of times that each of the substrings occurs in the set of substrings corresponding to the respective second subset B and the length of the substring is determined. At block 408, the CLP length corresponding to the substring having the largest product is determined as the deduplication grain. As a further example, supposing that the first subset A has a size of 1053696 bytes, the candidate set includes: (1) a CLP length of 351232 bytes, its corresponding substring appearing in the respective sets of substrings two times; (2) a CLP length of 87808 bytes, its corresponding substring appearing in the respective sets of substrings 640 times; and (3) a CLP length of 1568 bytes, its corresponding substring appearing in the respective sets of sub strings 1300 times.

As a result of the procedure from blocks 407 to 408, the CLP length of 87808 bytes can be determined as the deduplication grain. Therefore, the CLP length is not the largest but has the highest deduplication rate as the deduplication grain.

It is be appreciated that the implementation of FIG. 4 is only provided as an example, to which the present application is not limited. In some embodiments, only some of the filtering procedures may be included. In some embodiments, the sequence of the filtering procedures may be varied. In some embodiments, more filtering procedures may be included.

Moreover, the deduplication grain determined according to embodiments of the present disclosure is applicable to any data deduplication existing in the art or to be developed in the future. The specific operations of the data deduplication are omitted herein to avoid blurring the present invention.

The inventors have conducted verification for applications in different frameworks. The predicted results of the deduplication grain are listed below:

| Applications in different frames | TF MNIST MLP | TF MNIST CNN | Keras MNIST | Keras Resnet | Keras Xception | TF InceptionV3 |
| --- | --- | --- | --- | --- | --- | --- |
| Grain prediction (bytes) | 3136 | 3136 | 3136 | 12288 | 602112 | 629292 |

Figure 5:
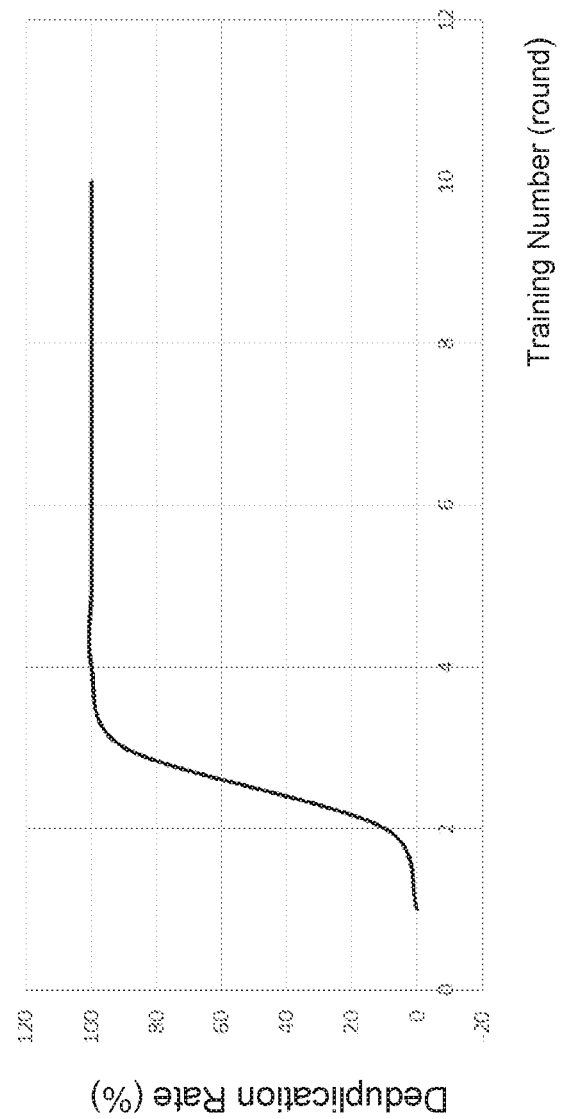
FIG. 5 illustrates a diagram of a change of a deduplication rate for a TensorFlow (TF) MNIST CNN (convolutional neural network) with training rounds according to embodiments of the present disclosure.

The deduplication results according to embodiments of the present disclosure will be described with TF MNIST CNN as an example. FIG. 5 illustrates a diagram of a change of a deduplication rate for a TF MNIST CNN with training rounds according to embodiments of the present disclosure. It is seen from FIG. 5 that the deduplication rate after the second training round is gradually increased to 100% in the solution of automatically predicting a deduplication grain according to embodiments of the present disclosure. This is because all randomly sorted data still fall within the range of the entire dataset, as a matter of fact.

In addition, the inventors have conducted verification through a network inbound/outbound reduction rate. The results are given below:

For MNIST: 32/(748*4)=1.02%, which demonstrates that the network inbound/outbound reduction rate is less than 1.02% when the entire dataset is traversed during training.

For CIFAR10: 32/(1024*3*4)=0.26%, which demonstrates that the network inbound/outbound reduction rate is less than 0.26% when the entire dataset is traversed during training.

For Inception V3: 32/(224*224*3*4)=0.005%, which demonstrates that the network inbound/outbound reduction rate is less than 0.005% when the entire dataset is traversed during training.

As seen above, the solution according to embodiments of the present disclosure can automatically predict different grains for a deduplication of different training datasets efficiently and transparently, and accomplish universality and flexibility of the GPUaaS architecture. In addition, the solution according to embodiments of the present disclosure can improve the deduplication rate, reduce network resource waste and improve the system efficiency.

Figure 6:
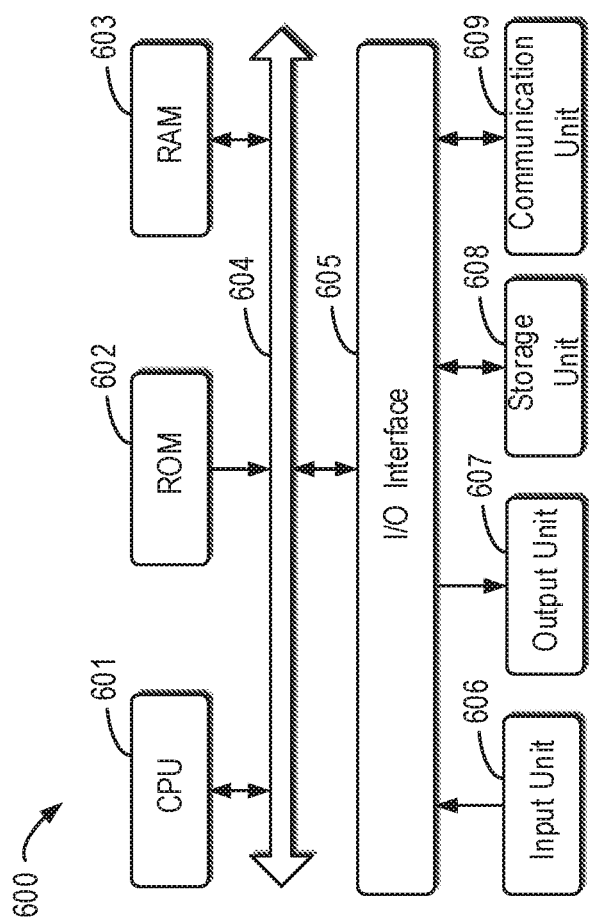
FIG. 6 illustrates a block diagram of an electronic device for implementing embodiments of the present disclosure.

FIG. 6 illustrates a diagram of an example device 600 for implementing embodiments of the present disclosure. The device 600 can implement clients 102, 104 and 106 and a server 108 as shown in FIG. 1. As shown therein, the device 600 includes a central processing unit (CPU) 601 which performs various appropriate acts and processing, based on a computer program instruction stored in a read-only memory (ROM) 602 or a computer program instruction loaded from a storage unit 608 to a random access memory (RAM) 603. The RAM 603 stores therein various programs and data required for operations of the device 600. The CPU 601, the ROM 602 and the RAM 603 are connected via a bus 604 with one another. An input/output (I/O) interface 605 is also connected to the bus 604.

The following components in the device 600 are connected to the I/O interface 605: an input unit 606 such as a keyboard, a mouse and the like; an output unit 607 including various kinds of displays and a loudspeaker, etc.; a storage unit 608 including a magnetic disk, an optical disk, and etc.;

a communication unit 609 including a network card, a modem, and a wireless communication transceiver, etc. The communication unit 609 allows the device 600 to exchange information/data with other apparatus through a computer network such as the Internet and/or various kinds of telecommunications networks.

Various processes and processing described above, e.g., the method 300 and/or method 400, may be executed by the processing unit 601. For example, in some embodiments, the method 300 and/or method 400 may be implemented as a computer software program that is tangibly included in a machine readable medium, e.g., the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more steps of the method 200 as described above may be executed. Alternatively, the CPU 601 can be configured to perform the method 300 and/or method 400 in any other appropriate manner (for example, by means of firmware) in other embodiments.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods according to the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine-readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A data processing method, comprising:
   obtaining a first subset and at least a second subset in a training dataset for learning, the first subset and the at least second subset having a same size;
   determining a set of substrings based on data strings in the first subset and the at least second subset, the substrings in the set of substrings being suffix substrings of the data strings and being sorted in a lexicographical order;
   determining a grain for deduplication of the training dataset from a set of longest common prefix (CLP) lengths of adjacent substrings in the set of substrings, for use in the deduplication; and
   training a machine learning model based on the determined grain and the deduplication of the training dataset.

2. The method of claim 1, wherein determining the set of substrings comprises:
   for each of the at least second subset,
      concatenating a first data string corresponding to the first subset and a second data string corresponding to the second subset by inserting a separator between the first data string and the second data string; and
      determining the set of substrings based on a sort of suffix substrings of the concatenated data string in the lexicographical order.

3. The method of claim 1, wherein determining the grain comprises:
   determining the grain from the set of the CLP lengths based on a length of the first subset and each CLP length in the set of the CLP lengths.

4. The method of claim 3, wherein determining the grain comprises:
   determining, for each CLP length in the set of the CLP lengths, a modulo operation result of the length of the first subset and the CLP length;
   in response to the modulo operation result being greater than zero, removing the CLP length from the set of the CLP lengths; and
   determining the grain from the set of the CLP lengths following the removing of the CLP length.

5. The method of claim 3, wherein determining the grain comprises:
   for each CLP length in the set of the CLP lengths,
      comparing the CLP length with a predetermined value, and
      in response to the CLP length being less than or equal to the predetermined value, removing the CLP length from the set of the CLP lengths; and
   determining the grain from the set of the CLP lengths following the removing of the CLP length.

6. The method of claim 1, wherein determining the grain comprises:
   determining the grain from the set of the CLP lengths based on a length of the first subset and a length of each substring in the set of substrings.

7. The method of claim 6, wherein determining the grain comprises:
   comparing a length difference between adjacent substrings with the length of the first subset;
   in response to the length difference being less than or equal to the length of the first subset, removing respective CLP lengths of the compared adjacent substrings from the set of the CLP lengths; and
   determining the grain from the set of the CLP lengths following the removing of the respective CLP lengths of the compared adjacent substrings.

8. The method of claim 1, wherein determining the grain comprises:
   determining the grain from the set of the CLP lengths based on the number of times that each substring in the set of substrings occurs in the set of substrings corresponding to the respective second subset.

9. The method of claim 8, wherein determining the grain comprises:
   determining a product of the number of times that each substring in the set of substrings occurs in the set of substrings corresponding to the respective second subset and a length of the substring; and
   determining a CLP length corresponding to the substring having the largest product as the grain.

10. An electronic device, comprising:
    a processor; and
    a memory storing instructions which, when executed by the processor, cause the electronic device to:
       obtain a first subset and at least a second subset in a training dataset for learning, the first subset and the at least second subset having a same size;
       determine a set of substrings based on data strings in the first subset and the at least second subset, the substrings in the set of substrings being suffix substrings of the data strings and being sorted in a lexicographical order;
       determine a grain for a deduplication of the training dataset from a set of longest common prefix (CLP) lengths of adjacent substrings in the set of substrings, for use in the deduplication; and
       train a machine learning model based on the determined grain and the deduplication of the training dataset.

11. The electronic device of claim 10, wherein the memory further stores instructions which, when executed by the processor, cause the electronic device to:
    for each of the at least second subset,
       concatenate a first data string corresponding to the first subset and a second data string corresponding to the second subset by inserting a separator between the first data string and the second data string; and
       determine the set of substrings based on a sort of suffix substrings of the concatenated data string in the lexicographical order.

12. The electronic device of claim 10, wherein the memory further stores instructions which, when executed by the processor, cause the electronic device to:
    determine the grain from the set of the CLP lengths based on a length of the first subset and each CLP length in the set of the CLP lengths.

13. The electronic device of claim 12, wherein the memory further stores instructions which, when executed by the processor, cause the electronic device to:
    determine, for each CLP length in the set of the CLP lengths, a modulo operation result of the length of the first subset and the CLP length;
    in response to the modulo operation result being greater than zero, remove the CLP length from the set of the CLP lengths; and
    determine the grain from the set of the CLP lengths following the removing of the CLP length.

14. The electronic device of claim 12, wherein the memory further stores instructions which, when executed by the processor, cause the electronic device to:
    for each CLP length in the set of the CLP lengths,
       compare the CLP length with a predetermined value, and
       in response to the CLP length being less than or equal to the predetermined value, remove the CLP length from the set of the CLP lengths; and
    determine the grain from the set of the CLP lengths following the removing of the CLP length.

15. The electronic device of claim 10, wherein the memory further stores instructions which, when executed by the processor, cause the electronic device to:
    determine the grain from the set of the CLP lengths based on a length of the first subset and a length of each substring in the set of substrings.

16. The electronic device of claim 15, wherein the memory further stores instructions which, when executed by the processor, cause the electronic device to:
    compare a length difference between adjacent substrings with the length of the first subset;
    in response to the length difference being less than or equal to the length of the first subset, remove respective CLP lengths of the compared adjacent substrings from the set of the CLP lengths; and
    determine the grain from the set of the CLP lengths following the removing of the respective CLP lengths of the compared adjacent substrings.

17. The electronic device of claim 10, wherein the memory further stores instructions which, when executed by the processor, cause the electronic device to:
    determine the grain from the set of the CLP lengths based on the number of times that each substring in the set of substrings occurs in the set of substrings corresponding to the respective second subset.

18. The electronic device of claim 17, wherein the memory further stores instructions which, when executed by the processor, cause the electronic device to:
    determine a product of the number of times that each substring in the set of substrings occurs in the set of substrings corresponding to the respective second subset and a length of the substring; and
    determine a CLP length corresponding to the substring having the largest product as the grain.

19. A non-transitory computer readable storage medium having computer executable instructions stored thereon which, when executed, cause a machine to implement a data processing method, comprising:
    obtaining a first subset and at least a second subset in a training dataset for learning, the first subset and the at least second subset having a same size;
    determining a set of substrings based on data strings in the first subset and the at least second subset, the substrings in the set of substrings being suffix substrings of the data strings and being sorted in a lexicographical order;

determining a grain for deduplication of the training dataset from a set of longest common prefix (CLP) lengths of adjacent substrings in the set of substrings, for use in the deduplication and training a machine learning model based on the determined grain and the deduplication of the training dataset.

20. The computer readable storage medium of claim 19, wherein determining the set of substrings comprises:
   for each of the at least second subset,
      concatenating a first data string corresponding to the first subset and a second data string corresponding to the second subset by inserting a separator between the first data string and the second data string; and
      determining the set of substrings based on a sort of suffix substrings of the concatenated data string in the lexicographical order.

\* \* \* \* \*